US012774843B2

(12) United States Patent
Kim

(10) Patent No.: US 12,774,843 B2
(45) Date of Patent: Oct. 27, 2026

(54) REFRIGERATOR

(71) Applicant: LG ELECTRONICS INC., Seoul (KR)

(72) Inventor: Hyunsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 18/514,067

(22) Filed: Nov. 20, 2023

(65) Prior Publication Data

US 2024/0230208 A1 Jul. 11, 2024

(30) Foreign Application Priority Data

Jan. 5, 2023 (KR) ........................ 10-2023-0001754

(51) Int. Cl.
*F25D 23/02* (2006.01)
*E05F 5/02* (2006.01)

(52) U.S. Cl.
CPC .............. *F25D 23/028* (2013.01); *E05F 5/02* (2013.01); *E05Y 2900/31* (2013.01); *F25D 2323/024* (2013.01)

(58) Field of Classification Search
CPC .... F25D 23/028; F25D 2323/024; E05F 5/02; E05F 5/10; E05Y 2900/31
USPC .......................................................... 312/405
See application file for complete search history.

(56) References Cited

U.S. PATENT DOCUMENTS

| | | | | |
|---|---|---|---|---|
| 8,578,558 B2 * | 11/2013 | Bonomie | E05D 7/0423 16/245 |
| 8,960,826 B2 * | 2/2015 | Choo | F25D 23/04 312/313 |
| 9,903,639 B2 * | 2/2018 | Eom | E05F 3/20 |
| 2010/0308705 A1 * | 12/2010 | Kwon | F25D 23/028 312/404 |
| 2013/0147337 A1 * | 6/2013 | Lim | F25D 25/027 312/404 |
| 2015/0276301 A1 * | 10/2015 | Oh | F25D 23/025 312/405 |
| 2016/0348414 A1 * | 12/2016 | Ivanovic | F24C 15/021 |
| 2017/0205135 A1 * | 7/2017 | Thayyullathil | F25D 23/028 |
| 2021/0364223 A1 * | 11/2021 | Oh | E05F 1/1246 |
| 2021/0364224 A1 * | 11/2021 | Oh | E05D 3/16 |

FOREIGN PATENT DOCUMENTS

KR 10-0596246 6/2006

* cited by examiner

*Primary Examiner* — James O Hansen
(74) *Attorney, Agent, or Firm* — KED & ASSOCIATES

(57) ABSTRACT

A refrigerator including a cabinet having a storage space; a door configured to open and close the storage space; a hinge device connected to the cabinet and the door to enable rotation of the door; a damping device in contact with the hinge device to control a closing speed of the door; and a bracket module provided on one side of the cabinet. The bracket module includes a hinge bracket on which the hinge device is mounted, and a damping bracket on which the damping device is mounted.

18 Claims, 10 Drawing Sheets

REFRIGERATOR

CROSS-REFERENCE TO RELATED APPLICATION

This application claims priority under 35 U.S.C. § 119 to Korean Application No. 10-2023-0001754, filed in Korea on Jan. 5, 2023, whose entire disclosure is hereby incorporated by reference.

BACKGROUND

1. Field

The present disclosure relates to a refrigerator.

2. Background

In general, a refrigerator is a home appliance that allows food to be stored at low temperatures in a storage space. To this end, refrigerators are designed to keep stored food in optimal condition by cooling the inside of the storage space using cold air generated through heat exchange with the refrigerant circulating in the refrigeration cycle.

Recently, refrigerators equipped with various structures and convenience devices that take user convenience into consideration have been released. In addition, as refrigerators become larger and more multi-functional, the requirements for safety standards and safety devices are being strengthened.

However, there are still some shortcomings in safety devices as refrigerators become larger and more multi-functional. For example, if the refrigerator door is closed too hard, the door may hit the main body of the refrigerator hard, creating a collision noise. Additionally, if the door hits the main body strongly and your fingers are caught, there is a risk of serious injury due to the collision force.

In Republic of Korea Patent Publication No. 10-0596246, a damper structure that can adjust the opening and closing speed of a door is disclosed.

However, this damper may be mounted in a fixed state on the cabinet to control the door closing speed. At this time, in the case of a built-in refrigerator placed adjacent to surrounding furniture, there is a problem in that it is difficult to separate and assemble when a service situation occurs in the future.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, specific embodiments of the present disclosure will be described in detail with drawings. However, the present disclosure cannot be said to be limited to the embodiments in which the spirit of the present disclosure is presented, and other degenerative disclosures or other embodiments included in the scope of the present disclosure can be easily suggested by adding, changing, or deleting other components.

Prior to a description, directions are defined. In an embodiment of the present disclosure, a direction toward a door is defined as a front direction with respect to a cabinet illustrated in FIGS. 1, a direction toward the cabinet with respect to the door is defined as a rear direction, a direction toward a bottom on which a refrigerator is installed is defined as a downward direction, and a direction away from the bottom is defined as an upward direction.

Figure 1:
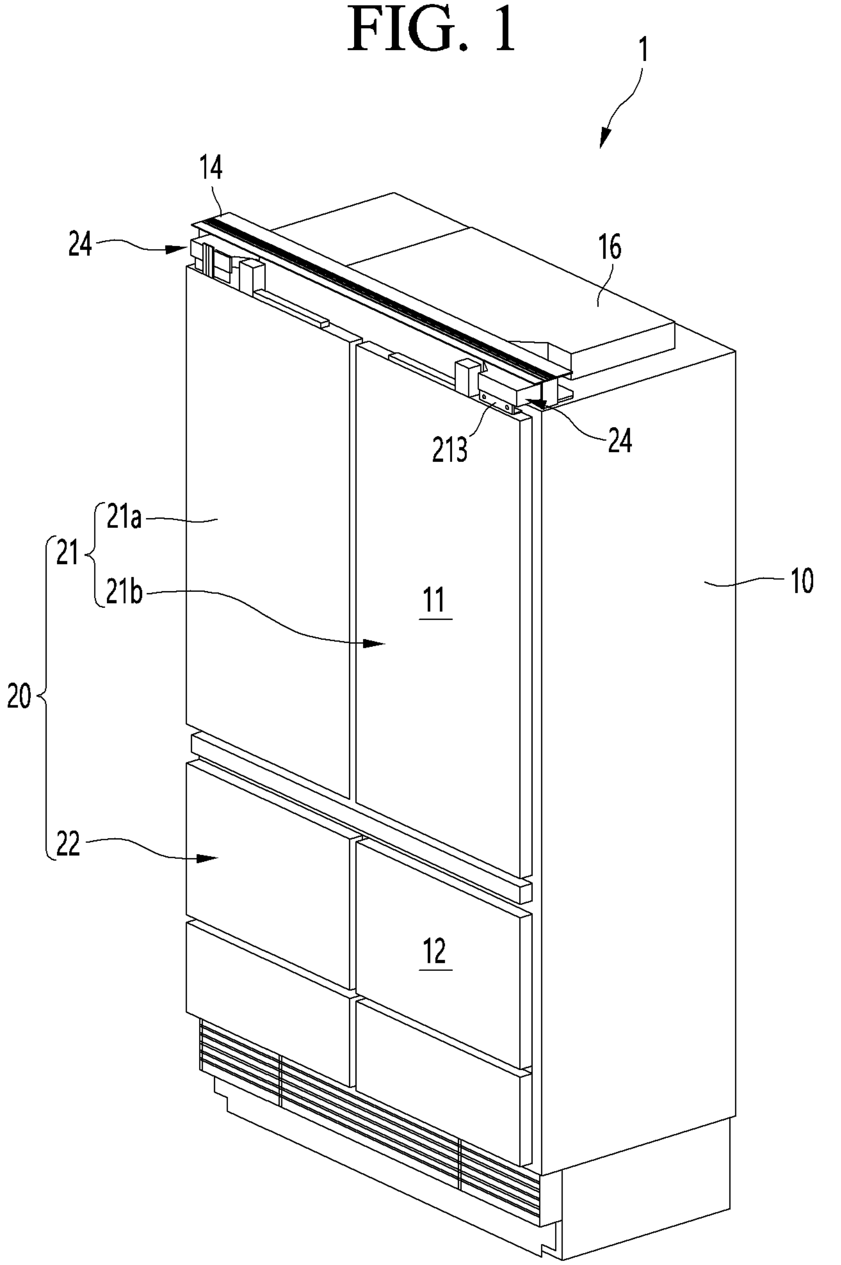
FIG. 1 is a perspective view illustrating a refrigerator according to an embodiment of the present disclosure.
Figure 2:
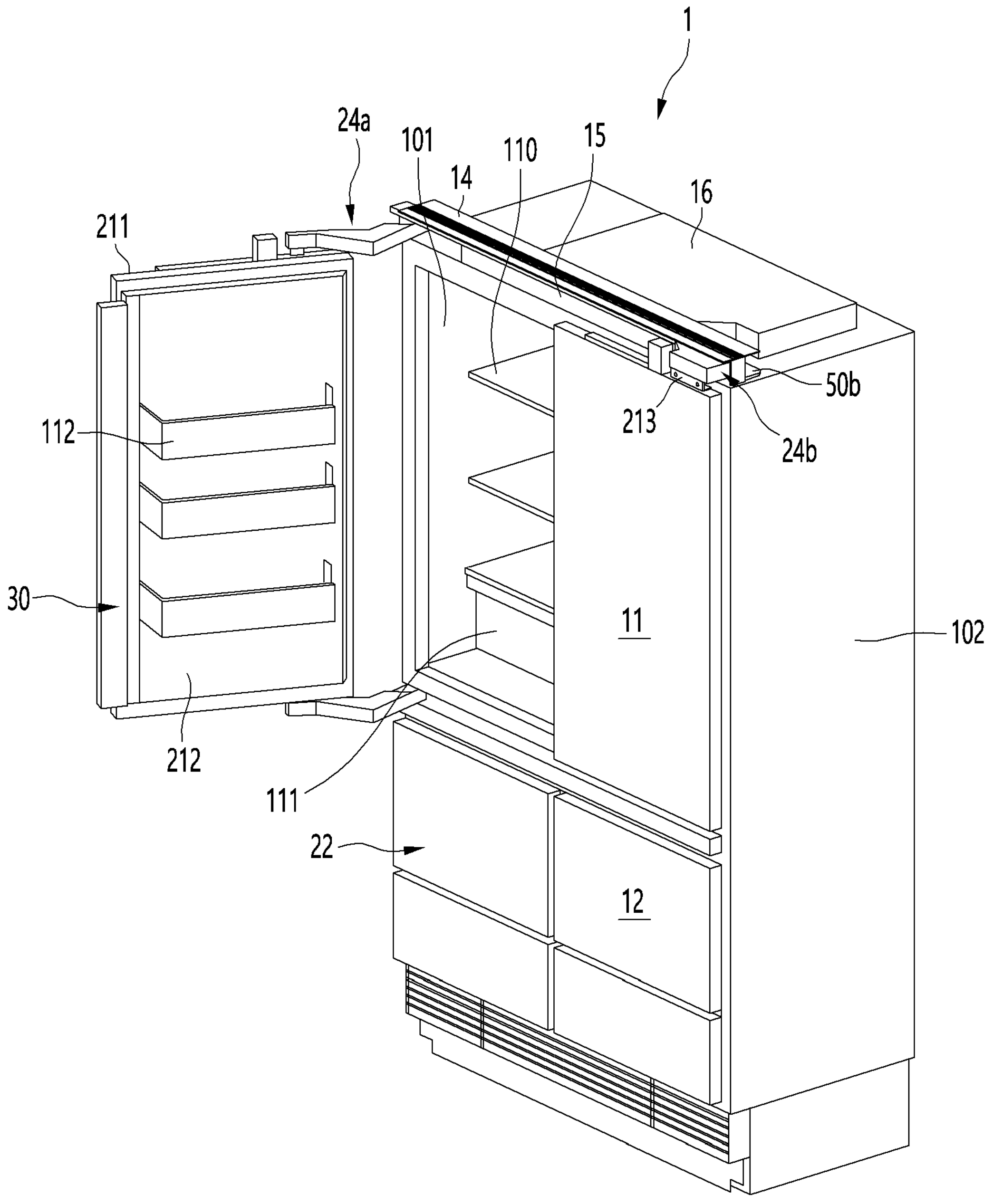
FIG. 2 is a perspective view of the refrigerator illustrating the door in an open state.

FIG. 1 is a perspective view illustrating a refrigerator according to an embodiment of the present disclosure, and FIG. 2 is a perspective view of the refrigerator illustrating the door in an open state.

The refrigerator 1 according to an embodiment of the present disclosure includes a cabinet 10 that forms a storage space, and a door 20 that opens and closes the storage space of the cabinet 10.

The cabinet 10 includes an inner case 101 that forms the wall of the storage space and an outer case 102 that forms the outer appearance. An insulator may be filled between the inner case 101 and the outer case 102.

The cabinet 10 may be formed with a plurality of storage spaces divided by a barrier 13. The upper storage space 11 may be formed as a refrigerating chamber, and the lower storage space 12 may be formed as a freezing chamber. Of course, the upper storage space 11 may be formed as a freezing chamber, and the lower storage space 12 may be formed as a refrigerating chamber, but are not limited thereto.

The door 20 may be configured to open and close the upper storage space 11 and the lower storage space 12, respectively. For example, the door 20 may be rotatably mounted on the cabinet 10 using a hinge device 24. Of course, the door 20 may have a structure in which the storage space is opened and closed by introduction and withdrawal.

The storage space 11 may be provided with a shelf 110 or drawer 111 on which food is placed, and a storage member such as a basket 112 may be provided at the rear of the door 20.

For example, the upper door 21 that opens and closes the upper storage space 11 may be rotatably mounted by a hinge device 24. The lower door 22 that opens and closes the lower storage space 12 may be provided as a drawer-type door that opens and closes by introduction and withdrawal.

The upper door 21 may include a first upper door 21*a* and a second upper door 21*b* arranged in the left and right direction.

The first upper door 21*a* may be rotatably connected to the left portion of the cabinet 10. The second upper door 21*b* may be rotatably connected to the right portion of the cabinet 10.

In some cases, the upper door may have one or more additional doors in addition to the two doors.

The lower door 22 can open and close the freezing chamber 12, for example, by sliding. In other words, the freezing chamber door may be a drawer-type door, for example.

A pillar 30 may be provided in either the first upper door 21*a* or the second upper door 21*b*. The pillar 30 serves to block cold air from leaking out of the refrigerating chamber 11 through the gaps between the plurality of upper doors 20 when the refrigerating chamber 11 is closed.

As an example, a pillar 30 is provided in the first upper door 21*a*. The first upper door 21*a* may include a door panel 211 that forms the front of the door, and a door liner 212 that is connected to the door panel 211 to form the rear surface of the door. The pillar 30 may be rotatably connected to the door liner 212, for example.

The pillar 30 is expanded when the first upper door 21*a* is closed to block communication between the gap between the first upper door 21*a* and the second upper door 21*b* and the refrigerating chamber 11. In addition, when the first upper door 21*a* is opened, the pillar 30 is folded in contact with the side of the first upper door 21*a*.

The upper door 21 may be rotatably connected to the cabinet 10 by a hinge device 24. The hinge device 24 may be a multi-joint hinge device including a plurality of links.

One side of the hinge device 24 may be connected to the door 20 and the other side thereof may be installed on the upper surface of the cabinet 10.

The refrigerator 1 may include a damping device 40 that reduces the closing speed of the door 20 during the process of opening and closing the door 20.

For example, the damping device 40 may be installed on the upper surface of the cabinet 10.

The damping device 40 may be in contact with the hinge device 24 and provides a damping force to the hinge device 24 to allow the door 20 to close smoothly.

Meanwhile, the damping device 40 includes a first damping device 40*a* applied to the first upper door 21*a* with a pillar 30, and a second damping device 40*b* applied to the second upper door 21*b* without pillar 30, which may be different. In detail, the first damping device 40*a* may be provided with a non-damping section in which the damping force is reduced in a section in contact with the pillar 30 in the middle of the point where the door is closed. The second damping device 40*b* may be configured so that the damping force increases consistently depending on the section in which the door is closed.

The hinge device 24 may include a first hinge device 24*a* connected to the first upper door 21*a* and a second hinge device 24*b* connected to the second upper door 21*b*. The first hinge device 24*a* and the second hinge device 24*b* may have different structures depending on need. Of course, the first hinge device 24*a* and the second hinge device 24*b* may have the same structure.

The refrigerator 1 may further include a door opening device for pushing the hinge device 24 to operate the hinge device 24 to rotate the door 20.

The refrigerator 1 may include a cover plate 14 disposed on the upper surface of the cabinet 10 to be spaced upward. The cover plate 14 may be formed to cover at least a portion of the hinge device 24 across the pair of hinge devices in the horizontal direction.

A PCB module 16 that controls settings of the refrigerator 1 may be mounted on the upper surface of the cabinet 10.

The refrigerator 1 of the present disclosure can be built into kitchen furniture. For example, a furniture cabinet may be installed in a kitchen or a specific space, and a refrigerator 1 may be accommodated within the furniture cabinet. Of course, even when the refrigerator 1 is used in a non-built-in state, the technology for the hinge device 24 and the damping device 40 of the present disclosure can be applied as it is.

Meanwhile, the present disclosure is not limited to the form described above and can be applied to all types of refrigerators equipped with a door.

Hereinafter, the hinge device 24 and the damping device 40 and the bracket module 50 that integrally combines the hinge device 24 and the damping device 40 according to an embodiment of the present disclosure will be described in detail.

Figure 3:
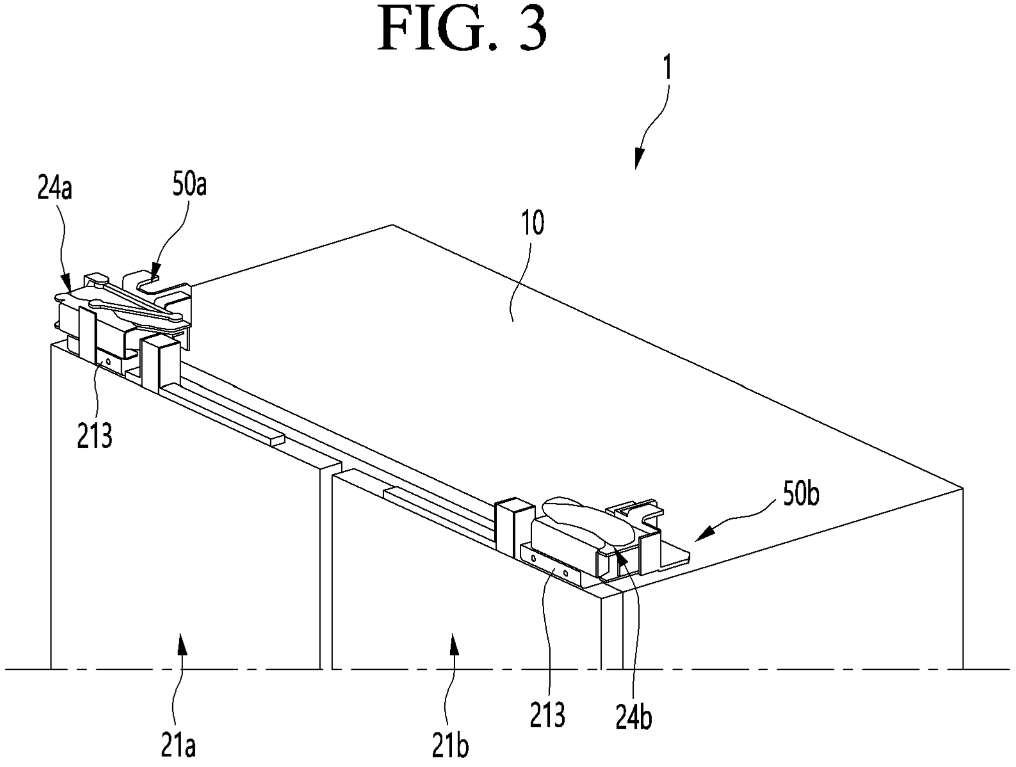
FIG. 3 is a view illustrating a state of the refrigerator viewed from above.

FIG. 3 is a view illustrating a state of the refrigerator viewed from above.

According to one embodiment of the present disclosure, the hinge device 24 and the damping device 40 may be integrally mounted on the bracket module 50. As the hinge device 24 and the damping device 40 are mounted integrally by the bracket module 50, the hinge device 24 can be mounted on the bracket module 50 having a relatively large area. Therefore, sagging due to the door load can be prevented by the bracket module 50. Additionally, the strength of the bracket module 50 on which the hinge device 24 is mounted can be improved.

The bracket module 50 may be provided on the upper surface of the cabinet 10. A hinge device 24 may be mounted on the bracket module 50.

A door bracket 213 formed to be coupled to the hinge device 24 may be provided on the upper surface of the door 20. The door bracket 213 may be coupled to the hinge bracket 51 through a fastening member while being disposed at the front end of the upper surface of the door 20.

The bracket module 50 may be provided with a space to accommodate the hinge device 24. The bracket module 50 may be formed to surround at least a portion of the rear surface and at least a portion of one side of the hinge device 24.

The damping device 40 may be mounted on the bracket module 50 at the rear of the hinge device 24.

The damping device 40 can adjust the closing speed of the door 20 by contacting the hinge device 24 while mounted on the bracket module 50.

This bracket module 50 may include a first bracket module 50*a* on which the first damping device 40*a* is mounted and a second bracket module 50*b* on which the second damping device 40*b* is mounted.

The first bracket module 50*a* and the second bracket module 50*b* may have mirror image symmetry structures and may have some different structures. Below, the bracket module 50 will be described in detail based on the first bracket module 50*a*.

Figure 4:
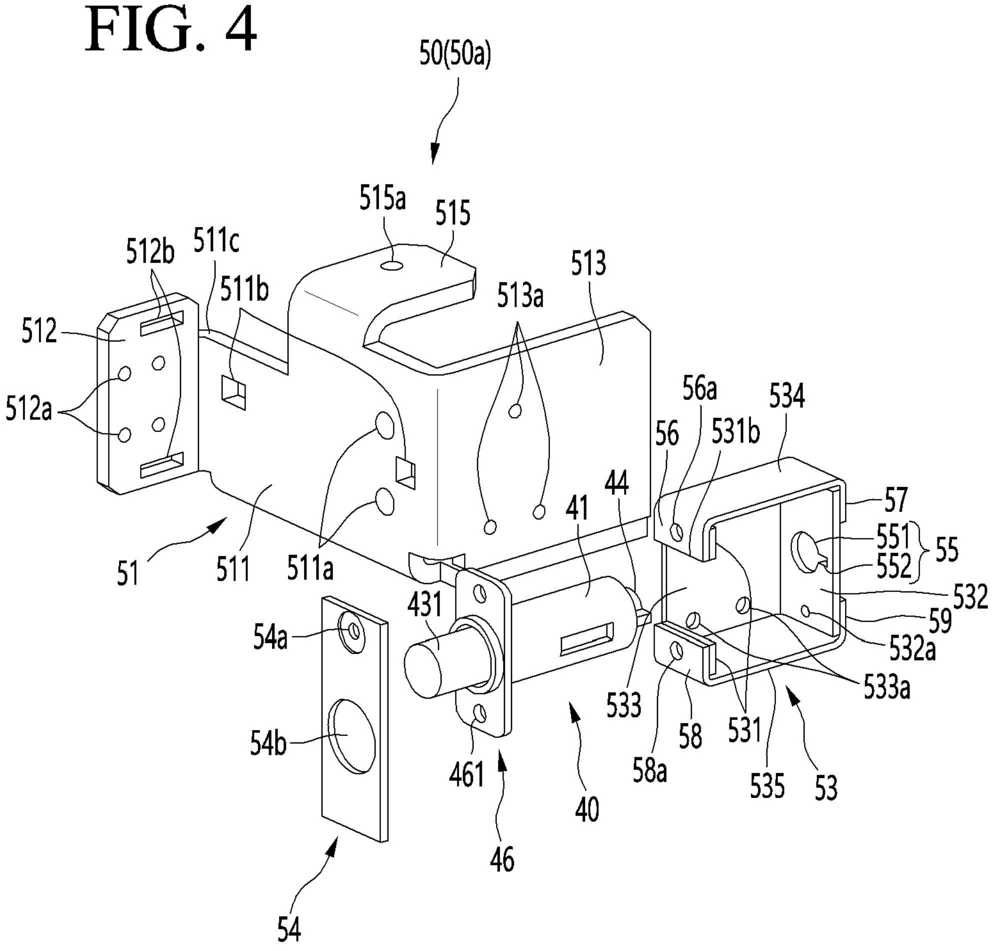
FIG. 4 is a view illustrating a state where the first damping device according to an embodiment of the present disclosure is separated from the first bracket module, as viewed from the first direction.
Figure 5:
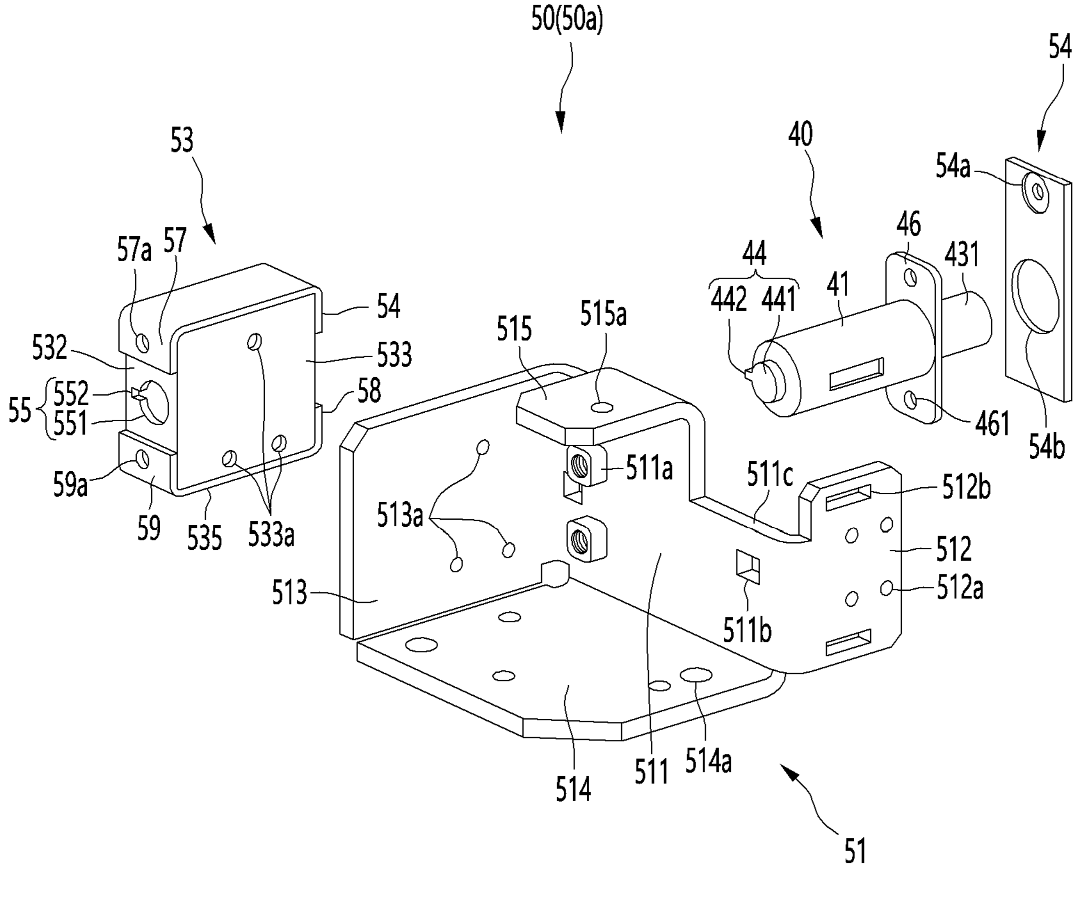
FIG. 5 is a view illustrating a state where the first damping device is separated from the first bracket module as viewed from a second direction.
Figure 6:
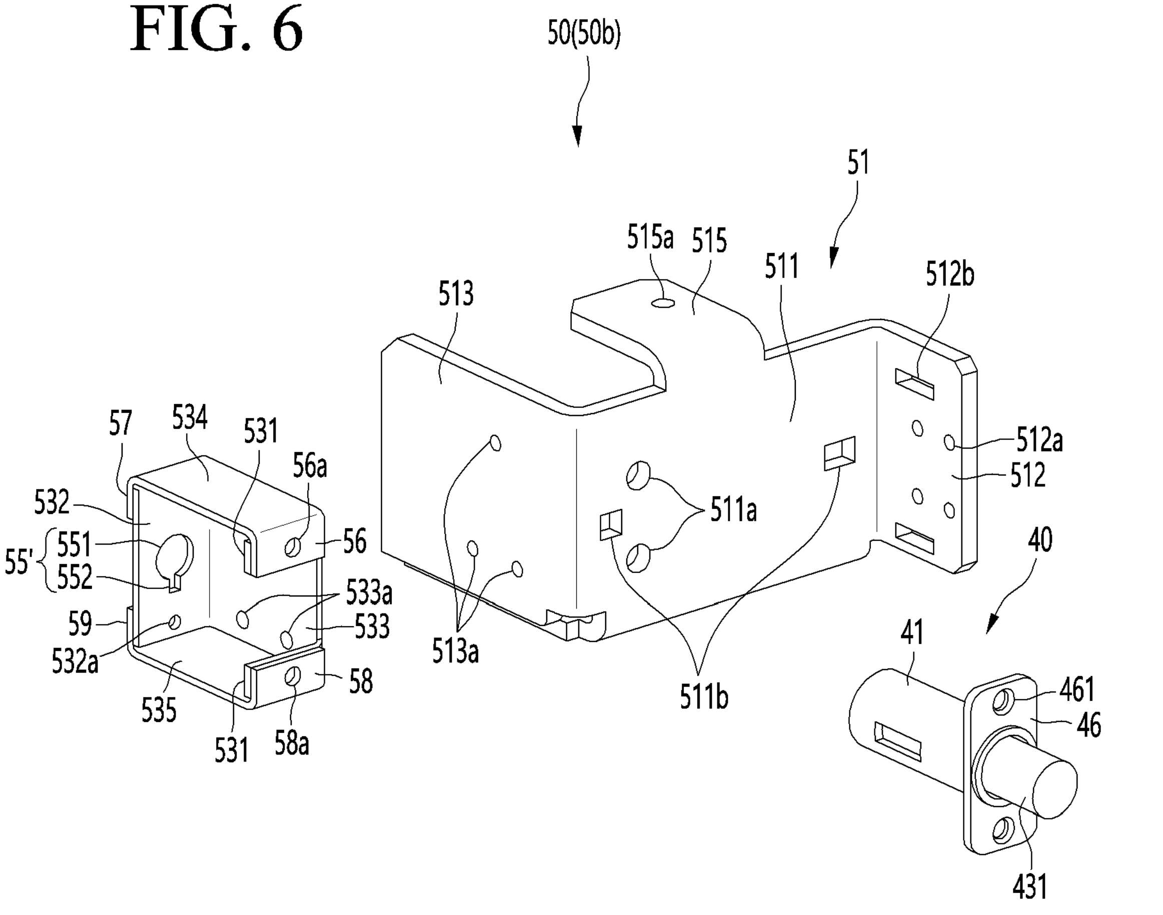
FIG. 6 is a view illustrating a state where the second damping device according to another embodiment of the present disclosure is separated from the second bracket module.
Figure 7:
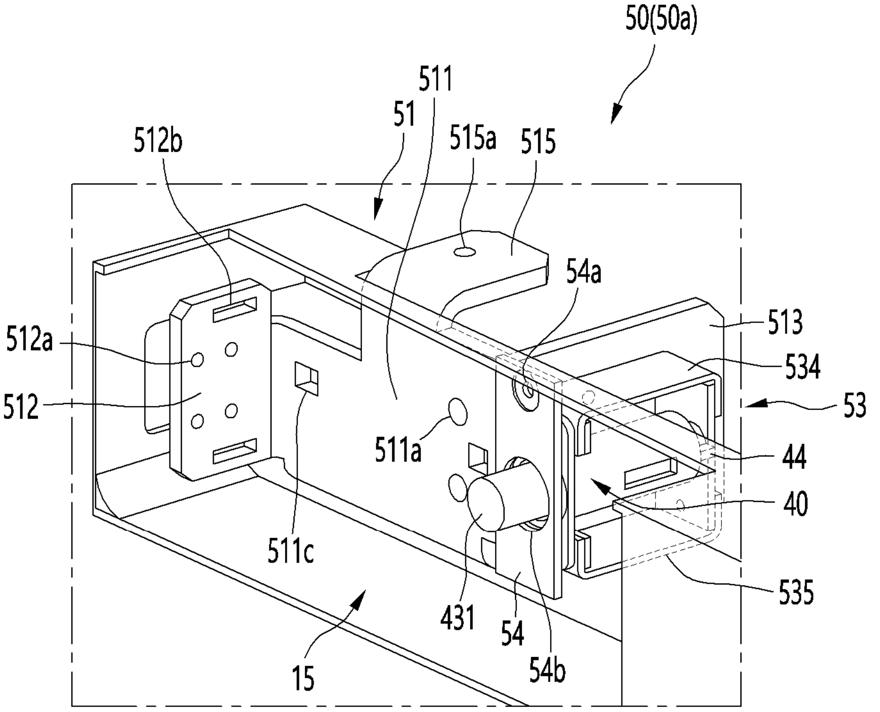
FIG. 7 is a diagram illustrating a state where the first damping device and the first bracket module are mounted on the door.

FIG. 4 is a view illustrating a state where the first damping device according to an embodiment of the present disclosure is separated from the first bracket module, as viewed from the first direction, FIG. 5 is a view illustrating a state where the first damping device is separated from the first bracket module as viewed from a second direction, FIG. 6 is a view illustrating a state where the second damping device according to another embodiment of the present disclosure is separated from the second bracket module, and FIG. 7 is a diagram illustrating a state where the first damping device and the first bracket module are mounted on the door.

The bracket module 50 includes a hinge bracket 51 on which the hinge device 24 is mounted, and a damping bracket 53 on which the damping device 40 is mounted.

The hinge bracket 51 and the damping bracket 53 may be formed independently and coupled to each other by a fastening member. In some cases, the hinge bracket 51 and the damping bracket 53 may be formed as one piece.

The hinge bracket 51 includes a first portion 511 extending along one side of the hinge device 24 and a second portion 512 bent from the first portion 511 along one side of the hinge device 24.

The first portion 511 and the second portion 512 may be formed to be in contact with a portion of the rear surface and one side of the hinge device 24.

A first portion hole 511*a* through which a fastening member passes so as to be coupled to one side of the hinge device 24 may be formed in the first portion 511. A plurality of first portion holes 511*a* may be provided in the first portion 511. For example, the first portion holes 511*a* may be formed as a pair in the first portion, spaced apart in the vertical direction.

A first guide hole 511*b* may be formed in the first portion 511 to guide the position where the hinge device 24 is coupled. For example, the first guide holes 511*b* may be formed as a pair in the first portion, spaced apart in the left and right horizontal direction. The first protrusion formed on the hinge device 24 may be inserted and restrained in the first guide hole 511*b*.

The second portion 512 may be coupled to one side of the hinge device 24 to support the hinge device 24. The second portion 512 may be bent and extended from the front end of the first portion 511 toward the door 20.

A second portion hole 512*a* may be formed in the second portion 512 through which a fastening member coupled to the side of the hinge device 24 passes. A plurality of second portion holes 512*a* may be provided in a predetermined shape in the second portion 512.

A second guide hole 512*b* may be formed in the second portion 512. For example, the second guide holes 512*b* may be formed as a pair in the second portion, spaced apart in the vertical direction. The second protrusion formed on the hinge device 24 may be inserted into the second guide hole 512*b* and restrained.

The hinge bracket 51 may include a third portion 513 coupled to the damping bracket 53. The third portion 513 may be bent and extended rearward from the first portion 511.

The hinge bracket 51 may have a second portion 512 extending in the direction of the door 20 on one side based on the first portion 511 and a third portion 513 extending in a direction away from the door 20 on the other side of the first portion 511.

In other words, the second portion 512 and the third portion 513 may extend in opposite directions with respect to the first portion 511.

The third portion 513 may be formed with a third portion hole 513*a* through which a fastening member passes so as to be coupled to the damping bracket 53. A plurality of third portion holes 513*a* may be provided. When the third portion holes 513*a* are connected to each other, the third portion holes 513*a* can be disposed to form a triangle.

For example, one third portion hole 513*a* may be provided at the upper end portion of the third portion 513, and two third portion holes 513*a* may be provided at the lower end portion of the third portion 513 to be spaced apart from each other. In this case, when combining the hinge bracket 51 and the damping bracket 53, misassembly can be prevented.

The hinge bracket 51 may include a fourth portion 514 extending from the bottom of the first portion 511 along the direction in which the third portion 513 extends. The fourth portion 514 may be in contact with the upper surface of the cabinet 10. The fourth portion 514 may be connected to the first portion 511 and the third portion 513.

A fourth portion hole 514*a* through which a fastening member passes so as to be fixed to the upper surface of the cabinet 10 may be formed in the fourth portion 514. A plurality of fourth portion holes 514*a* may be provided in the fourth portion 514.

In this way, the hinge bracket 51 is provided so that the first portion 511 and the second portion 512 are coupled to the hinge device 24, and the third portion 513 is coupled to the damping bracket 53. Additionally, the fourth portion 514 may be coupled to the upper surface of the cabinet 10.

The hinge bracket 51 may further include a fifth portion 515 extending from the upper end of the first portion 511 in the same direction as the third portion 513. The fifth portion 515 may be provided with a fifth portion hole 515*a* through which a fastening member passes so as to be coupled to the cover plate 14.

The upper end of the first portion 511 may be formed to have a different height relative to the fourth portion 514. For example, a portion of the upper end of the first portion 511, which is connected to the second portion 512 may be formed to be lower in height than the portion thereof which is connected to the third portion 513. The portion connected to the second portion 512 at the upper end of the first portion 511 may be referred to as a stepped portion 511*c*. In the process of mounting the hinge device 24 to the hinge bracket 51 by the stepped portion 511*c*, it can be easily coupled with the fastening member.

The damping bracket 53 may be coupled to the third portion 513 of the hinge bracket 51. The damping bracket 53 may be provided with a space 52 in which the damping device 40 is accommodated. The damping bracket 53 may be located behind the hinge device 24.

The damping bracket 53 includes a first part 531 having an opening 531*b* through which the damping device 40 is inserted, and a second part 532 into which the damping device 40 is inserted and fixed.

The first part 531 may form the front surface of the damping bracket 53. The first part 531 may be disposed at a position corresponding to the first portion 511 of the hinge bracket 51. At least a portion of the first part 531 has an opening 531*b* so that the damping device 40 can be inserted into the damping bracket 53. The first part 531 may be formed with a first part hole 531*a* penetrating the fastening member. The first part hole 531*a* may be formed at the upper end and lower end of the first part 531, respectively. In the first part hole 531*a*, the damping device 40 may be fixed to the first part 531 by a fastening member passing through the plate hole 461 of the damping device 40.

The second part 532 may form the rear surface of the damping bracket 53. A fastening portion 55 into which the insertion portion 44 of the damping device 40 is inserted may be provided at the center portion of the second part 532.

The second part 532 may be provided with a second part hole 532*a* at the upper end and rear end, respectively.

The fastening portion 55 includes a first fastening portion 551 and a second fastening portion 552 and may be formed in different shapes.

For example, the fastening portion 55 may be formed in the shape of a key. The fastening portion 55 may include a first fastening portion 551 formed in a circular shape and a second fastening portion 552 formed in a square shape extending from one side of the first fastening portion 551.

Additionally, the insertion portion 44 of the damping device 40 may be provided in a shape corresponding to the fastening portion 55. The position where the damping device 40 is inserted can be guided by the second fastening portion 552. Through this, it is possible to prevent misassembly by guiding the position where the damping device 40 is mounted on the damping bracket 53.

Furthermore, the first bracket module 50*a* on which the first damping device 40*a* is mounted and the second bracket module 50*b* on which the second damping device 40*b* is mounted may have different shapes of the fastening portions 55. For example, the directions in which the second fastening portion 552 of the first bracket module 50*a* and the second fastening portion 552 of the second bracket module 50*b* extend from the first fastening portion 551 may be different from each other. This can also be called a fool proof structure.

In detail, the second fastening portion 552 of the fastening portion 55 of the first bracket module 50*a* may extend laterally from the first fastening portion 551, that is, in the 3 o'clock or 9 o'clock direction. Additionally, the insertion portion 44 of the first damping device 40*a* may be formed in a shape corresponding to the fastening portion 55 of the first bracket module 50*a*.

The second fastening portion 552 of the fastening portion 55 of the second bracket module 50*b* may extend upward or downward from the first fastening portion 551, that is, in the 12 o'clock or 6 o'clock direction. Additionally, the insertion portion 44 of the second damping device 40*b* may be formed in a shape corresponding to the fastening portion 55 of the second bracket module 50*b*.

With this structure, the first damping device 40*a* can be mounted only on the first bracket module 50*a*, and the second damping device 40*b* can be mounted only on the second bracket module 50*b*. Accordingly, the first damping device 40*a* and the second damping device 40*b* can prevent misassembly between the second bracket module 50*b* and the first bracket module 50*a*.

The damping bracket 53 includes a third part 533 coupled to the third portion 513 of the hinge bracket 51. The third part 533 may form one side of the damping bracket 53.

In the third part 533, a third part hole 533*a* may be formed at a position corresponding to the third portion hole 513*a*. The third part holes 533*a* may be provided in different numbers at the upper end portion of the third part 533 and the lower end portion of the third part 533.

For example, a plurality of third part holes 533*a* are formed in the third part 533, and a triangle can be drawn by connecting the plurality of third part holes 533*a* to each other.

Through this, it is possible to prevent misassembly by guiding the position where the damping bracket 53 is mounted on the hinge bracket 51. This can also be called a fool proof structure.

The damping bracket 53 may include a fourth part 534 and a fifth part 535 extending to one side from the upper end and the lower end of the third part 533.

The fourth part 534 and the fifth part 535 may form the upper and lower surfaces of the damping bracket 53, respectively. The fourth part 534 and the fifth part 535 may each extend along the direction in which the third portion 513 extends. The fourth part 534 and the fifth part 535 may extend shorter than the length that the third portion 513 extends from the first portion 511.

The third part 533, the fourth part 534, and the fifth part 535 may be connected to each other to provide a space 52 in which the damping device 40 is accommodated.

The damping bracket 53 may include a first coupling portion 56 extending downward from the front end of the fourth part 534. The first coupling portion 56 may be formed integrally with the fourth part 534 and may be formed to surround the first part 531 from the front.

The first coupling portion 56 may include a first coupling hole 56*a* that can be coupled to the damping device 40. The fastening member that has passed through the plate hole 461 of the damping device 40 may pass through the first coupling hole 56*a* and the first part hole 531*a*. Accordingly, the plate portion 46 of the damping device 40, the first part 531, and the first coupling portion 56 may be coupled to each other.

The damping bracket 53 may include a second coupling portion 57 extending downward from the rear end of the fourth part 534. The second coupling portion 57 may be formed integrally with the fourth part 534 and may be formed to surround at least a portion of the second part 532 from the rear.

A second coupling hole 57*a* may be provided in the second coupling portion 57. The fastening member penetrates the second coupling hole 57*a* and the second part hole 532*a*, so that the second coupling portion 57 and the second part 532 can be coupled.

The damping bracket 53 may include a third coupling portion 58 extending upward from the front end of the fifth part 535. The third coupling portion 58 may be formed integrally with the fifth part 535 and may be formed to surround the first part 531 from the front.

The third coupling portion 58 may include a third coupling hole 58*a* that can be coupled to the damping device 40. The fastening member that has passed through the plate hole 461 of the damping device 40 may pass through the third coupling hole 58*a* and the first part hole 531*a*. Accordingly, the plate portion 46 of the damping device 40 and the first part 531 and the fourth part 534 may be coupled to each other.

The damping bracket 53 may include a fourth coupling portion 59 extending rearward from the rear end of the fifth part 535. The fourth coupling portion 59 may be formed to surround the second part 532 from the rear.

A fourth coupling hole 59*a* is provided in the fourth coupling portion 59, and the fastening member passes through the fourth coupling hole 59*a* and the second part hole 532*a*, so that the fifth part 535 may be coupled to the second part 532.

The bracket module 50 may further include a cover bracket 54. The cover bracket 54 may be disposed in front of the first part 531 of the damping bracket 53. The cover bracket 54 is provided to cover the plate portion 46 in a state where the damping device 40 is mounted on the damping bracket 53.

The cover bracket 54 may have a cover hole 54*a* formed at one end. A fastening member coupled to the hinge cover 15 disposed on the upper surface of the cabinet may pass through the cover hole 54*a*. At this time, the cover hole 54*a* may be formed singly at the upper end or the lower end of the cover bracket 54. For example, the cover hole 54*a* may be formed at the upper end of the cover bracket 54. In this case, the worker can easily access the damping device 40 after removing the cover bracket 54.

The cover bracket 54 may be formed with a through hole 54*b* through which the contact portion of the damping device 40 passes.

This cover bracket 54 may be formed to have a length corresponding to the length of the hinge cover 15 in the vertical direction.

Meanwhile, the damping device 40 may be provided on the upper surface of the cabinet 10 while being mounted on the damping bracket 53. The damping device 40 may include a housing 41 and a cylinder 43 movably disposed in the housing 41.

An insertion portion 44 mounted on the fastening portion 55 of the bracket module 50 may be provided at the end portion 410 of the housing 41. The insertion portion 44 is formed in a shape corresponding to the fastening portion 55. For example, the insertion portion 44 may be formed in the cross-sectional shape of a key. The insertion portion 44 may include a first insertion portion 441 formed in a circular shape and a second insertion portion 442 extending from one side of the first insertion portion 441.

At this time, the insertion portions 44 of the first damping device 40*a* and the second damping device 40*b* may be formed differently. In detail, the second insertion portion 442 extending from the first insertion portion 441 may be formed in a different position.

With this structure, it is possible to prevent the first damping device 40*a* from being mounted on the second bracket module 50*b* or the second damping device 40*b* from being mounted on the first bracket module 50*a*.

The housing 41 may include a first housing 412 and a second housing 414. The first housing 412 and the second housing 414 each include a space. At this time, the width or diameter of the space of the first housing 412 is smaller than the width or diameter of the second housing 414. Accordingly, a stepped portion 413 is formed on the inner circumferential surfaces of the first housing 412 and the second housing 414.

A plate portion 46 is provided between the first housing 412 and the second housing 414. The plate portion 46 may include a plate hole 461 through which a fastening member passes so as to be coupled to the first part 531 of the damping bracket 53.

Figure 8:
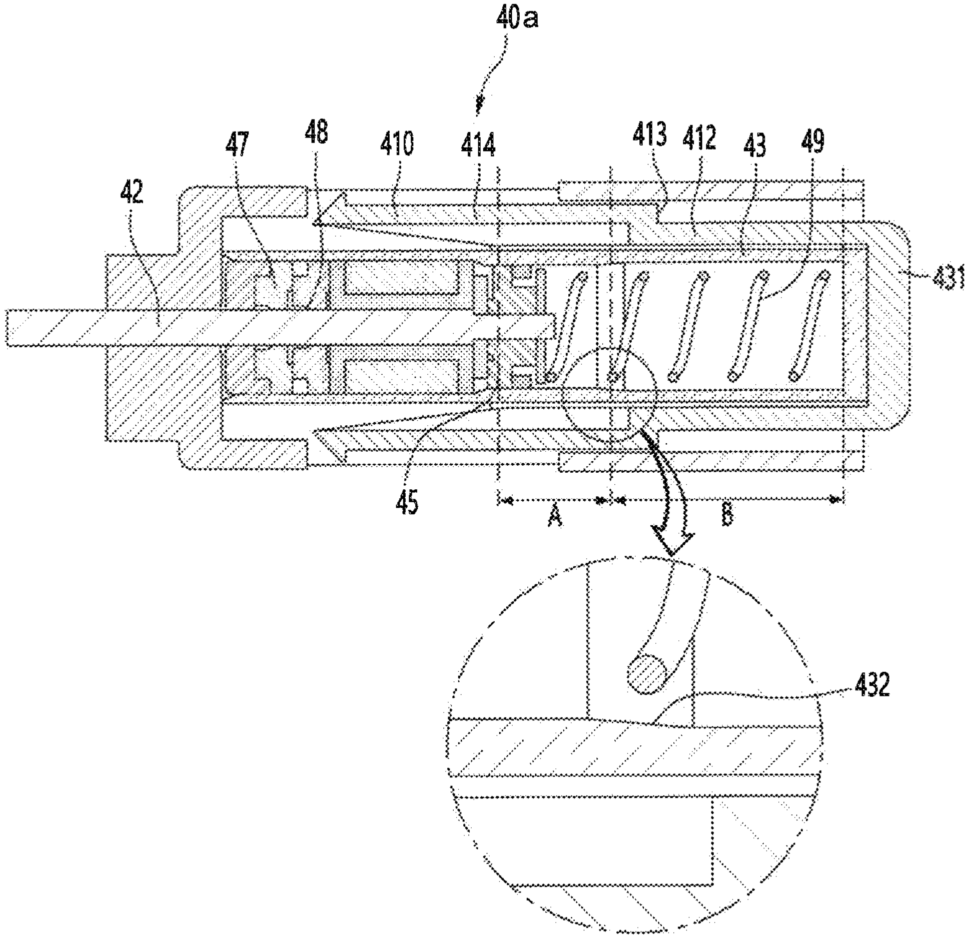
FIG. 8 is a view illustrating the first damping device.
Figure 9:
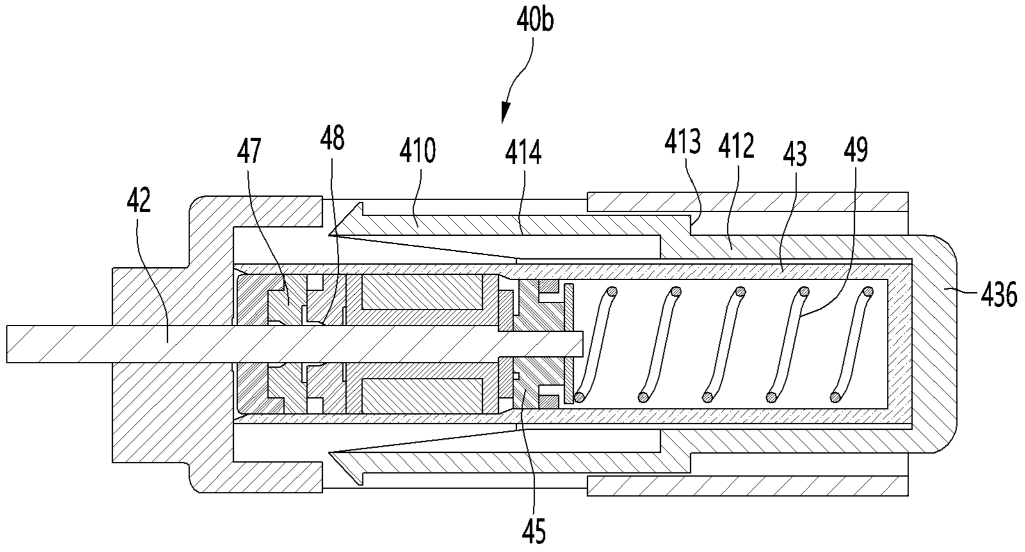
FIG. 9 is a view illustrating a second damping device.

FIG. 8 is a view illustrating the first damping device, and FIG. 9 is a view illustrating a second damping device.

A rod 42 may be provided within the housing 41 of the damping device 40. A movable member 47 may be coupled to the rod 42. The rod 42 passes through the movable member 47, and the movable member 47 can move along the rod 42 in the longitudinal direction of the rod 42 on the outer circumferential surface of the rod 42.

An oil flow path portion 45 may be coupled to the other end portion of the rod 42. The oil flow path portion 45 may provide a passage through which the oil filled in the cylinder 43 flows during the movement of the cylinder 43.

A portion of the cylinder 43 may be accommodated inside the housing 41. The cylinder 43 may be formed in a hollow cylindrical shape. With the cylinder 43 accommodated in the housing 41, the rod 42, the movable member 47, and the oil flow path portion 45 can be accommodated inside the cylinder 43. The inside of the cylinder 43 may be filled with oil, and a sealing portion may be provided within the cylinder 43 to prevent oil leakage.

The end portion of the cylinder 43 may be provided with a contact portion 431 that may be in contact with the hinge device 24.

The damping device 40 may further include a first elastic member 48 that elastically supports the movable member 47, and a second elastic member 49 that provides elastic force so that the cylinder 43 protrudes out of the housing 41.

In a state where no external force is applied to the cylinder 43, the cylinder 43 protrudes outward from the housing 41 to the maximum extent by the second elastic member 49. When an external force is applied to the cylinder 43, oil flows toward the movable member 47. When oil passes through the oil flow path portion 45, the cylinder 43 moves in a direction toward being introduced into the housing 41. In this process, a damping force is generated to reduce the closing speed of the door 20.

Meanwhile, the damping device 40 includes a first damping device 40*a* applied to the first upper door 21*a* with a pillar 30, and a second damping device 40*b* applied to the second upper door 21*b* without a pillar 30, which may be different from each other.

For example, the first damping device 40*a* may further include an expansion portion 432. The first damping device 40*a* may further include an expansion portion 432 that divides the damping section A and the non-damping section B. The non-damping section B is a section where the pillar is in contact during the door closing process and may be a section where the damping force of the damping device 40 is reduced compared to the damping force of the damping section A.

In detail, the non-damping section B may have a larger diameter of the cylinder 43 than the damping section A due to the expansion portion 432. The contact portion 431 may be provided with a non-damping section B in which the contact portion 431 is not contacted by the expansion portion 432 inside the cylinder.

Through this, the door 20 can be closed in the section where the pillar 30 is in contact without interference from the damping device 40.

Meanwhile, the second damping device 40*b* may not be provided with such an expansion portion 432. Accordingly, the cylinder 43 can be formed to have a constant diameter in the sliding direction. In this case, as the door 20 is closed, the damping force may gradually increase.

In this way, the first upper door 21*a* and the second upper door 21*b* may be provided with a first damping device 40*a* and a second damping device 40*b* having different structures, respectively. Additionally, a first hinge device 24 and a first damping device 40*a* may be mounted on the first bracket module 50*a*. A second hinge device 24 and a second damping device 40*b* may be mounted on the second bracket module 50*b*. At this time, the first bracket module 50*a* and the second bracket module 50*b* each have a fool proof structure to prevent mixing during the assembly process.

Figure 10:
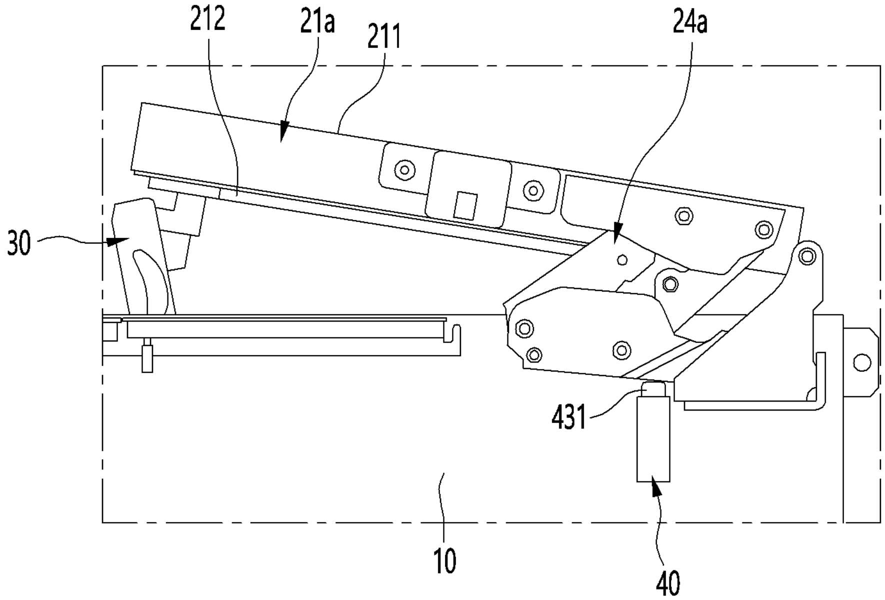
FIG. 10 is a view to explain a state where the damper device operates during the door closing process.

FIG. 10 is a view to explain a state where the damper device operates during the door closing process.

In the process of closing the door 20 by the user, the closing force of the door 20 is provided by the damping device 40. In other words, a portion of the hinge device 24 presses the cylinder 43 of the damping device 40.

Then, the oil passes through the oil flow path portion 45. The movable member 47 moves in a direction away from the oil flow path portion 45 due to the oil passing through the oil flow path portion 45. When the oil flow path portion 45 is located in the damping section of the cylinder 43, a damping force is generated in the damping device 40. The closing speed of the door 20 is reduced by the damping force, allowing the door 20 to close smoothly.

Meanwhile, in one embodiment, it has been described that the damping device 40 is in contact with the hinge device 24, but unlike this, it is also possible for the damping device 40 to be directly in contact with the door 20.

This embodiment provides a refrigerator whose door can be closed smoothly during the process of opening and closing the refrigerator door.

This embodiment provides a refrigerator in which the problem of door sagging due to door weight is improved.

This embodiment provides a refrigerator equipped with a damping device that can be easily separated and assembled when service is needed.

A refrigerator according to an embodiment of the present disclosure is characterized in that a hinge bracket on which a hinge device is mounted and a damping bracket on which a damping device is mounted are integrated.

A refrigerator according to an embodiment of the present disclosure includes a cabinet having a storage space; a door opening and closing the storage space; a hinge device connected to the cabinet and the door to enable rotation of the door; a damping device in contact with the hinge device to control closing speed of the door; and a bracket module provided on one side of the cabinet, in which the bracket module includes: a hinge bracket on which the hinge device is mounted, and a damping bracket on which the damping device is mounted.

The hinge bracket may include: a first portion forming one side; a second portion extending from one end of the first portion in a direction toward the door and coupled to the hinge device; and a third portion extending from the other end of the first portion in a direction away from the door and coupled to the damping bracket.

The third portion may include: a plurality of third portion holes through which a fastening member passes so as to be coupled to the damping bracket, and wherein the plurality of third portion holes are disposed in different numbers at the upper end portion of the third portion and at the lower end portion of the third portion.

The hinge bracket may further include: a fourth portion extending along one side of the cabinet and coupled to the cabinet.

The damping bracket may include: a first part having an opening through which the damping device is inserted, a second part formed at a position facing the first part and to which the damping device is fixed, and a third part coupled to the hinge bracket.

The second part may include a fastening portion coupled to the insertion portion of the damping device, and the fastening portion may include a first fastening portion and a second fastening portion formed in different shapes.

The insertion portion may include a first insertion portion provided in a shape corresponding to the first fastening portion, and a second insertion portion provided in a shape corresponding to the second fastening portion.

The third part may include a plurality of third part holes through which a fastening member passes so as to be coupled to the hinge bracket, and the plurality of third part holes may be disposed in different numbers at the upper end portion of the third part and at the lower end portion of the third part.

The damping bracket may include: a fourth part extending in one direction from the upper end of the third part to form an upper surface of the damping bracket; and a fifth part extending in one direction from the lower end of the third part to form a lower surface of the damping bracket.

Each of the fourth part and the fifth part may include a coupling portion extending along the first part and located in front of the first part.

The damping device may include a housing in which a cylinder and a rod are accommodated, and a plate portion extending from the outer surface of the housing and coupled to the first part.

The plate portion may include a plate hole through which the fastening member passes, and the fastening member may penetrate the coupling portion and is coupled to a first part hole formed in the first part.

One side of the cabinet may include a hinge cover on which the hinge device is mounted, and the bracket module may further include a cover bracket disposed in front of the first part and coupled to the hinge cover.

The damping device may include a contact portion in contact with the hinge device, and the cover bracket may include: a through hole through which the contact portion passes, and a cover hole through which a fastening member passes so as to be coupled to the hinge cover.

The door may include a first door with a pillar and a second door without a pillar which are provided side by side in the horizontal direction, the damping device may include: a first damping device in contact with a first hinge device connected to the first door and is provided with an expansion portion for a non-damping section; and a second damping device in contact with a second hinge device connected to the second door and is not provided with the expansion portion, and the bracket module may include a first bracket module on which the first damping device is mounted and a second bracket module on which the second damping device is mounted.

The first bracket module may include a first fastening portion into which the insertion portion of the first damping device is inserted, the second bracket module may include a second fastening portion into which the insertion portion of the second damping device is inserted, and the first fastening portion and the second fastening portion may be provided to have different shapes based on the state where the first bracket module and the second bracket module are mounted on the cabinet.

The first fastening portion and the second fastening portion may include a first portion formed in a circular shape and a second portion extending in one direction from the first portion, respectively, and the second portions of the first fastening portion and the second fastening portion may be different from each other based on a state where the first bracket module and the second bracket module are mounted on the cabinet.

According to this embodiment, a damping device in contact with the hinge device is provided, so that the refrigerator door can be closed smoothly during the process of opening and closing the door.

This embodiment includes a bracket module in which a hinge bracket on which a hinge device is mounted and a damping bracket on which a damping device is mounted are integrated. The hinge device connects the door when mounted on the bracket module, which has the advantage of improving the problem of door sagging due to the weight of the door. In addition, the damping bracket is provided to be detachable from the front of the door, which has the advantage of being easy to separate and assemble when servicing the damping device is needed.

According to this embodiment, the first bracket module on which the first damping device is mounted and the second bracket module on which the second damping device is mounted may have different structures. Therefore, there is an advantage in preventing the first damping device, which controls the closing speed of the first door equipped with a pillar, and the second damping device, which adjusts the closing speed of the second door, from being used and assembled together.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
- a cabinet having a storage space;
- a door configured to open and to close the storage space;
- a hinge device configured to couple to the cabinet and to the door and enable rotation of the door;
- a damping device configured to contact the hinge device and control a closing speed of the door;
- a bracket module provided on the cabinet, wherein the bracket module includes:
  - a hinge bracket for mounting of the hinge device, and a damping bracket for mounting of the damping device, wherein the hinge bracket is mounted on the cabinet and the damping bracket is installed onto the hinge bracket from a front of the door; and
  - a cover bracket disposed in front of the damping bracket and configured to selectively cover and provide access to the damping bracket; and
- a hinge cover mounted on an upper surface of the cabinet and configured to cover the hinge device, wherein the damping device includes a contact component to contact the hinge device, and wherein the cover bracket includes:
  - a through hole configured such that the contact component of the damping device passes through the through hole of the cover bracket, and a cover hole configured such that a first fastening member passes through the cover hole to couple to the hinge cover.

2. The refrigerator of claim 1, wherein the hinge bracket includes:
- a first portion;
- a second portion extending from a first end of the first portion in a first direction, wherein the second portion is configured to couple to the hinge device; and
- a third portion extending from a second end of the first portion in a second direction opposite from the first direction, and wherein the third portion is configured to couple to the damping bracket.

3. The refrigerator of claim 2, wherein the third portion of the hinge bracket includes:
- a plurality of holes configured such that a second fastening member passes through the plurality of holes to couple to the damping bracket, and wherein a total number of the plurality of holes at an upper end of the third portion is different than a total number of the plurality of holes at a lower end of the third portion.

4. The refrigerator of claim 3, wherein the hinge bracket includes:

a fourth portion configured to couple to the cabinet.

5. The refrigerator of claim 1, wherein the damping bracket includes:

a first part having an opening configured to allow insertion of the damping device, a second part at a position facing the first part and configured to attach the damping device to the damping bracket, and a third part configured to couple to the hinge bracket.

6. The refrigerator of claim 5, wherein the second part of the damping bracket includes a fastening portion to couple to an insertion component of the damping device, and wherein the fastening portion includes a first fastening portion and a second fastening portion having a different shape than the first fastening portion.

7. The refrigerator of claim 6, wherein the insertion component of the damping device includes:

a first insertion component having a shape corresponding to the first fastening portion, and a second insertion component having a shape corresponding to the second fastening portion.

8. The refrigerator of claim 5, wherein the third part of the damping device has a plurality of holes configured such that a second fastening member passes through the plurality of holes to couple to the hinge bracket, and wherein a total number of the plurality of holes at an upper end of the third part is different from a total number of the plurality of holes at a lower end of the third part.

9. The refrigerator of claim 5, wherein the damping bracket includes:

a fourth part extending from an upper end of the third part to form an upper surface of the damping bracket; and a fifth part extending from a lower end of the third part to form a lower surface of the damping bracket.

10. The refrigerator of claim 9, wherein the fourth part includes a first coupling part extending along an upper front of the first part, and the fifth part includes a second coupling part extending along a lower front of the first part.

11. The refrigerator of claim 5, wherein the damping device includes:

a housing to accommodate a cylinder and a rod, and a plate extending from the housing configured to couple to the first part of the damping bracket.

12. The refrigerator of claim 11, wherein the plate includes a plate hole configured such that a second fastening member passes through the plate hole and is configured to couple to a hole formed in the first part of the damping bracket.

13. The refrigerator of claim 1, wherein the door includes a first door having a pillar and a second door without a pillar which are provided side by side, wherein the damping device includes:

a first damping device configured to contact a first hinge device coupled to the first door and having an expansion portion for a non-damping section; and a second damping device configured to contact a second hinge device coupled to the second door and not provided with the expansion portion, and wherein the bracket module includes:

a first bracket module for mounting of the first damping device; and a second bracket module for mounting of the second damping device.

14. The refrigerator of claim 13, wherein the first bracket module includes a first fastening portion configured for insertion of an insertion component of the first damping device, wherein the second bracket module includes a second fastening portion configured for insertion of an insertion component of the second damping device.

15. The refrigerator of claim 13, wherein the first fastening portion and the second fastening portion each separately include a first portion having a circular shape and a second portion extending from the first portion, and wherein the second portions of the first fastening portion and the second fastening portion are different from each other based on a state where the first bracket module and the second bracket module are mounted on the cabinet.

16. A refrigerator, comprising:

a cabinet having a storage space;

a door configured to open and to close the storage space;

a hinge device configured to couple to the cabinet and to the door and enable movement of the door;

a damping device configured to control a movement speed of the door;

a hinge bracket configured to couple to the hinge device;

a damping bracket for mounting of the damping device, wherein the hinge bracket is mounted on the cabinet and the damping bracket is installed onto the hinge bracket from a front of the door;

a cover bracket disposed in front of the damping bracket and configured to selectively cover and provide access to the damping bracket; and a hinge cover mounted on an upper surface of the cabinet and configured to cover the hinge device, wherein the damping device includes a contact component to contact the hinge device, and wherein the cover bracket includes:

a through hole configured such that the contact component of the damping device passes through the through hole of the cover bracket, and a cover hole configured such that a first fastening member passes through the cover hole to couple to the hinge cover.

17. The refrigerator of claim 16, wherein the hinge bracket includes:

a first surface;

a second surface extending from a first end of the first surface, wherein the second surface is configured to couple to the hinge device; and a third surface extending from a second end of the first surface, and wherein the third surface has a plurality of holes for coupling the third surface to the damping bracket.

18. The refrigerator of claim 17, wherein the damping bracket includes:

a first part having an opening configured to allow insertion of the damping device, a second part configured to attach the damping device to the damping bracket, and wherein the second part includes a fastening portion configured to couple to an insertion component of the damping device, and a third part configured to couple to the hinge bracket.

* * * * *